United States Patent
Chen et al.

(10) Patent No.: US 8,011,560 B2
(45) Date of Patent: Sep. 6, 2011

(54) APPARATUS AND METHOD OF SOLID-STATE WELDING

(75) Inventors: Yen-Lung Chen, Troy, MI (US); Mark T. Hall, Troy, MI (US); Robert L. Totten, Lake Orion, MI (US); Robert T. Szymanski, St. Clair Township, MI (US); Xiaohong Q Gayden, West Bloomfield, MI (US); Gregory A. Fischer, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 502 days.

(21) Appl. No.: 11/930,956

(22) Filed: Oct. 31, 2007

(65) Prior Publication Data
US 2008/0135601 A1  Jun. 12, 2008

Related U.S. Application Data

(60) Provisional application No. 60/869,626, filed on Dec. 12, 2006.

(51) Int. Cl.
*B23K 31/02* (2006.01)
(52) U.S. Cl. .................................... 228/112.1; 228/102
(58) Field of Classification Search ................. 228/102, 228/112.1
See application file for complete search history.

(56) References Cited

U.S. PATENT DOCUMENTS

| | | | |
|---|---|---|---|
| 3,482,296 A | 12/1969 | Sampatacos | |
| 5,460,317 A | 10/1995 | Thomas et al. | |
| 5,813,592 A | 9/1998 | Midling et al. | |
| 6,601,751 B2 | 8/2003 | Iwashita | |
| 6,806,436 B2 | 10/2004 | Katou et al. | |
| 7,121,451 B2 | 10/2006 | Kano et al. | |
| 2005/0029331 A1* | 2/2005 | Kano et al. | 228/112.1 |
| 2007/0164086 A1* | 7/2007 | Hochhalter et al. | 228/112.1 |

* cited by examiner

*Primary Examiner* — Jessica L Ward
*Assistant Examiner* — Nicholas P D'Aniello
(74) *Attorney, Agent, or Firm* — Quinn Law Group, PLLC (57) ABSTRACT

The present invention provides an apparatus and improved method of friction stir spot welding that assures a predetermined bottom thickness and a reduction in variation in a series of resultant spot welds. The advantage of the present invention lies in that the plunge distance is controlled from the top plane of the anvil against which the bottom thickness is specified, and systematically adjusted to account for changing system parameters, such as, but not limited to, deflection and thermal expansion of the weld gun. The present invention also provides for improved and controlled weld quality through implementation of a dwell operation or dwell operations, whereby weld heat input is manipulated by causing the weld tool to dwell in a dwell region or at a desired depth or depths within the workpiece(s) for a predetermined time interval to achieve desired mechanical properties of the resultant weld joint.

25 Claims, 4 Drawing Sheets

APPARATUS AND METHOD OF SOLID-STATE WELDING

CLAIM OF PRIORITY

This application claims priority to U.S. Provisional Patent Application No. 60/869,626, filed on Dec. 12, 2006, which is hereby incorporated by reference in its entirety.

TECHNICAL FIELD

The present invention relates to methods of solid-state welding for joining two or more workpieces or for operating on a single workpiece, and an apparatus for using the same.

BACKGROUND OF THE INVENTION

Welding is a manufacturing or fabrication process that bonds materials, usually metals or thermoplastics, by causing coalescence—the process by which two separate units grow together, fuse, or merge into a single body. The materials are joined by liquefying or plasticizing (e.g., soften without liquefying) the areas to be bonded together, generally through the application of heat and/or pressure over time, promoting coalescence of the liquefied or plasticized material, and allowing the coalesced material to cool, thereby solidifying the bond. Welding can be used, for example, to join two or more workpieces or for operating on a single workpiece (i.e., to repair a crack or join a member.)

The quality of a weld is predominantly determined by its strength and the strength of the material around it. Weld quality is influenced by various factors, the most influential factor being the method of welding.

One such method is friction welding. Traditional friction welding, which is a form of solid-state welding, involves the rubbing of two workpieces together at a controlled speed to create mechanical friction. The friction generates heat that allows both components to reach a plastic state. Once a plasticized region is created, the workpieces are forced together to form a bond. The bond is initiated when layers of plasticized material from both components intertwine and create new layers of combined material. The bond is finalized by stopping the relative movement of the workpieces and allowing the plasticized region to solidify, thereby joining the pieces.

Friction stir welding, a species of traditional friction welding and solid-state joining techniques, combines the processes of extruding and forging. Friction stir welding uses a wear resistant, cylindrical shouldered tool with a profiled pin. Frictional heat is generated between two or more adjacent workpieces by slowly forcing the welding tool into the joint line between the workpieces and contemporaneously rotating the tool. The tool is fed into, and translated along the joint line between the two work regions, which are butted together, at a constant traverse rate. The frictional heat causes the workpieces to yield and soften without actually reaching the material's melting point. As it does so, the plasticized material is transferred from the leading edge of the tool to the trailing edge of the tool shoulder and pin, leaving a solid phase bond between the two workpieces.

Friction stir spot welding is a variation of the friction stir welding solid-state technique. To that regard, a friction stir spot weld is produced by the application of pressure and heat that is generated by friction between a rotating, wear-resistant profiled tool and the workpiece(s). However, unlike standard friction stir welding, the weld tool in friction stir spot welding does not traverse along the joint line of the workpieces, but is rather plunged into the workpiece(s) and contemporaneously rotated to produce a single spot weld.

The strength of a friction stir spot weld or joint is predominantly influenced by the plunge depth of the weld tool or the remaining thickness of the weld. Current friction stir spot weld machines utilize one of two methods to reach plunge depth: (1) Force and Time-Controlled, i.e., welding at a certain force level for a specified time interval; and (2) Time-Controlled, e.g., welding at a programmed plunge depth with a programmed plunge speed. With the addition of a given plunge speed, a weld time is calculated from the desired plunge depth, at the end of which, welding is ended. However, in these traditional friction stir spot weld methods, a "plunge depth" that is not a true depth of plunge is programmed. In this invention, plunge distance is used instead of the conventional plunge depth. Plunge distance is defined as the distance the weld tool is plunged relative to a point of reference on its rotational axis. Bottom thickness of a friction stir spot weld is defined as the remaining thickness at the bottom of the hole left by the weld tool (dimension C in FIG. 4).

SUMMARY OF THE INVENTION

The present invention provides an apparatus and improved method of friction stir spot welding ("FSSW") that assures a predetermined bottom thickness, and reduced variations in a series of spot welds by continuously monitoring changes in various system parameters and adjusting the system accordingly.

In a first preferred embodiment of the present invention, an apparatus for welding one or more workpieces at a plurality of operating regions is provided. Preferably, the apparatus has a frame with a repositionable support (or "anvil") mounted thereto and configured to hold, reinforce, and or maintain the aforementioned workpieces during welding. The apparatus also includes a sleeve, a weld tool, a controller, and a plurality of sensing mechanisms. The sleeve is attached, mounted, or secured to the frame preferably coaxially opposite the support. The sleeve is configured to rotate about and translate along a reference axis. The weld tool is attached, mounted, or secured to the sleeve, whereby the sleeve supports, rotates, and translates (i.e., "plunges") the weld tool. Ideally, the weld tool includes a tool body having opposing first and second ends, wherein the first end is configured to attach, mount, or secure the weld tool to the sleeve. It is further preferred that the second end include a shouldered portion proximate to a probe, wherein the probe may be smooth or includes threads or grooves.

The controller, also referred to hereinafter as an electronic control unit (ECU), is connected to the sleeve and is configured to control the rotation and translation of the sleeve, and thus operation of the weld tool, during welding. The apparatus also includes at least one, but preferably a multitude of sensor devices that are connected to the controller and configured to monitor, track, or detect various system parameters. One of the sensor devices is configured to monitor system deflection and transmit signals indicative thereof to the controller. Similarly, a second sensor device is configured to monitor weld gun growth, resulting from thermal expansion, and transmit second signals indicative thereof to the controller.

The controller has memory containing an algorithm, which in turn is programmed and configured to calculate, determine, or command at least the following: calculate a plunge distance in response to at least the signals from the first and second sensing devices; command the sleeve to plunge the weld tool into the operating region of the workpiece(s) at a predetermined plunge speed and a predetermined plunge force and cause relative rotational movement between the weld tool and workpieces, thereby causing the operating region to take up a plasticized condition; command the sleeve to withdraw the weld tool from the operating region once the plunge distance has been reached, wherein the operating region is allowed to cool and the plasticized condition to reverse.

Optimally, the controller is also programmed and configured to command the sleeve to rotate the weld tool at varying depths within a predetermined dwell region for a predetermined dwell time before commanding the sleeve to withdraw the weld tool from the operating region. If so desired, the controller can rotate the weld tool at varying speeds during the dwell time. Alternatively, the dwell region can be a single depth or point within the operating region.

In accordance with a second preferred embodiment of the present invention, an improved method is provided that assures a controlled actual plunge distance in operating on a single workpiece or joining a plurality of workpieces by a friction stir spot welding system. The method includes the steps of: monitoring or determining a system deflection; determining and calibrating a zero position; monitoring the thermal expansion or growth of the FSSW weld gun to determine if the growth exceeds a predetermined tolerance; compensating the FSSW system if the weld gun growth exceeds the predetermined tolerance; calculating a plunge distance relative to the zero position based upon at least a predetermined or actual total stack-up thickness, the system deflection, and the bottom thickness; causing or programming a wear-resistant FSSW weld tool to enter the joining/operating region at the predetermined plunge force and plunge speed and contemporaneously causing relative rotational movement between the weld tool and the workpiece(s), whereby pressure and frictional heat is generated, thereby causing the joining/operating region to take up a plasticized condition; promoting coalescence in the joining/operating region; and causing or programming the weld tool to exit the joining/operating region after the bottom thickness has been reached, wherein the joining/operating region is allowed to cool and the plasticized material therein to harden, thereby completing a single weld operation on the workpiece(s).

Preferably, the method also provides for the control and manipulation of the strength and appearance of the weld joint by manipulating weld heat input. More specifically, the method preferably includes causing the rotating FSSW tool to dwell at varying depths within a dwell region for a predetermined time interval to thereby achieve desired mechanical properties of the FSSW joint. If desired, the weld tool can be rotated at varying speeds during the dwell time, and the dwell operation can be performed at more than one depth to provide for even further control and manipulation of weld characteristics. Alternatively, the dwell region can be a single depth or point within the operating region.

This method provides a "real position-controlled" friction stir spot welding technique, namely, a programmed bottom thickness is achieved at an actual position in the workpiece(s). The advantage of the present invention lies in that the programmed bottom thickness is controlled closely and consistently throughout the welding process, thereby achieving the mechanical properties of the FSSW joint necessary to maintain certain predetermined tolerances. The bottom thickness is controlled relative to the top surface of the anvil as the remaining thickness. The apparatus and method allows for the FSSW system to achieve the actual bottom thickness value and then terminates the welding process. The proposed method minimizes and/or eliminates the effect of various system variables that may potentially compromise the integrity and strength of the resultant weld.

The above features and advantages, and other features and advantages, of the present invention are readily apparent from the following detailed description of the preferred embodiments and best modes for carrying out the invention when taken in connection with the accompanying drawings.

DESCRIPTION OF THE PREFERRED EMBODIMENTS

Figure 1:
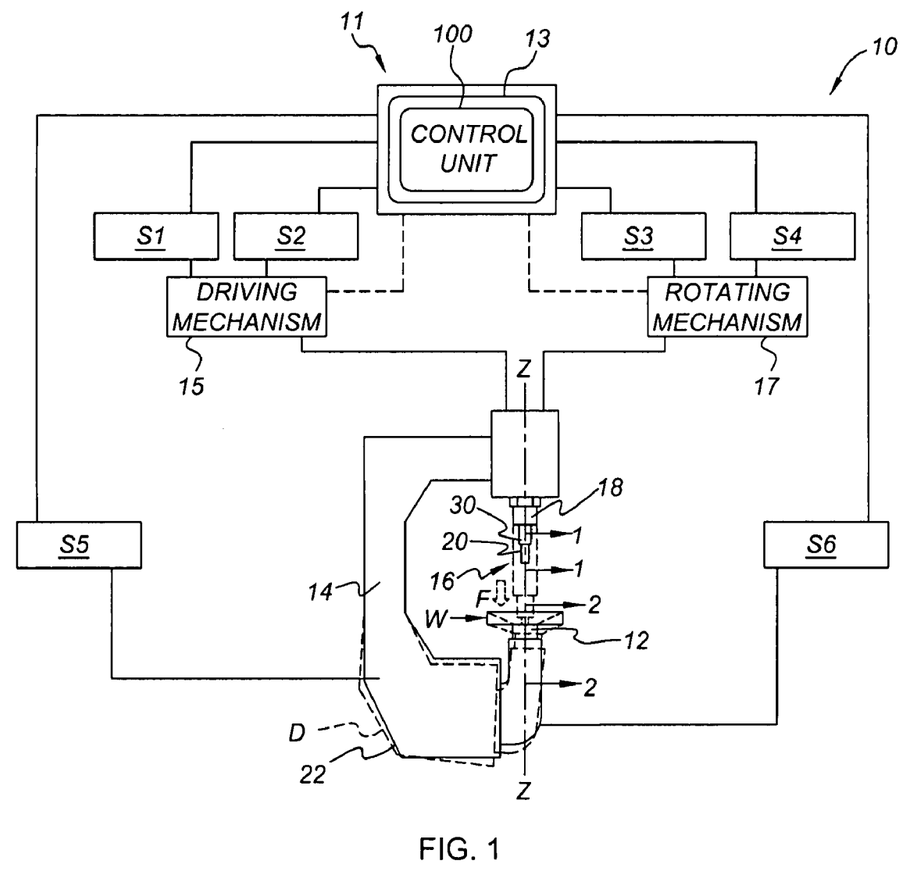
FIG. 1 is a partial side-schematic view of an exemplary friction stir spot welding apparatus or system having a plurality of sensors connected to a microprocessor-based control unit for carrying out the control of the present invention.

Referring to the figures, wherein like reference numbers refer to like components throughout the several views, there is shown a friction stir spot welding (FSSW) system or apparatus, partially illustrated and identified generally in FIG. 1 as element 10. The present invention will be described herein with respect to the FSSW apparatus 10 as an exemplary application by which the present invention may be incorporated; the present invention by no means being limited to the particular configuration or structure of FIGS. 1-4. To that extent, the present invention can be used in a variety of manufacturing processes. By way of example, the apparatus and method provided herein can be employed for operating on a single workpiece, for joining two or more workpieces together, or for joining two ends of a single workpiece together, as will be explained in detail hereinafter. In addition, the present invention can be applied in both 2-dimensional and 3-dimensional applications.

Figure 2:
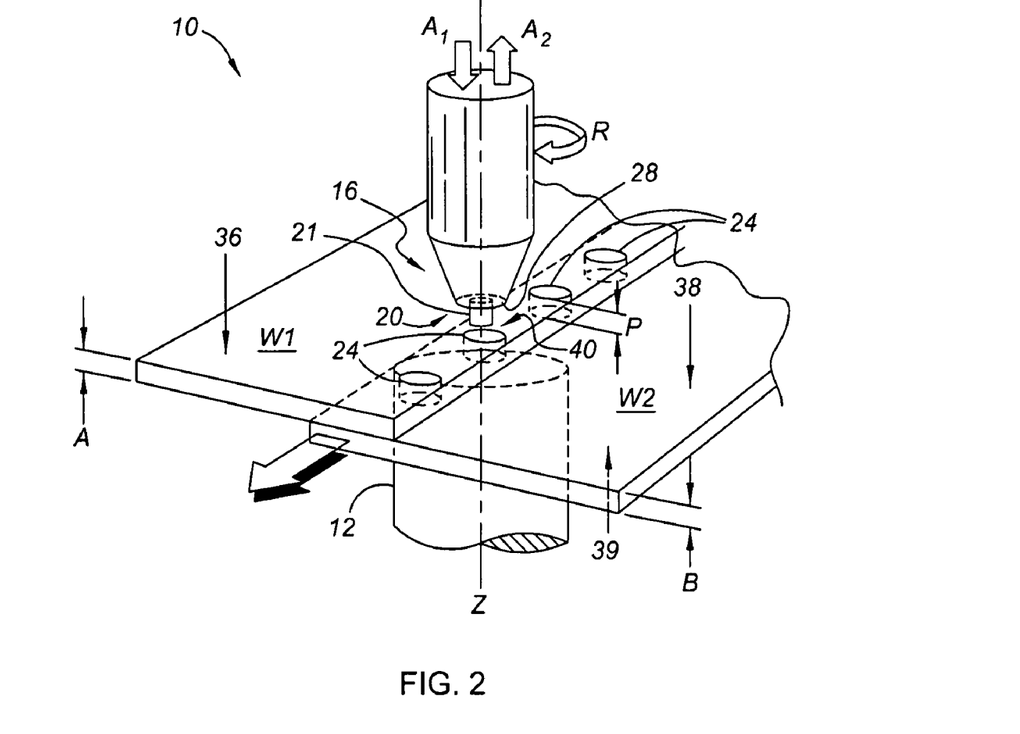
FIG. 2 is an enlarged schematic isometric depiction of a friction stir spot welding system in accordance with the apparatus of FIG. 1.
Figure 4:
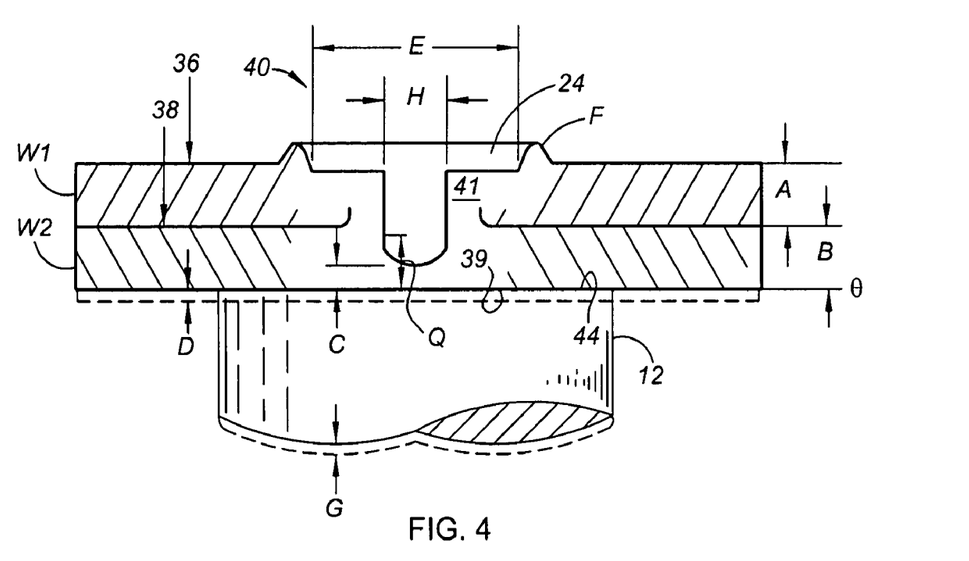
FIG. 4 is a cross-sectional side-view taken along line 2-2 of FIG. 1 illustrating first and second workpieces, a joining region, and a FSSW weld in accordance with the present invention.

The FSSW system 10 includes an anvil or support 12 and a frame 14, also referred to by those skilled in the art as a "C-Frame," "a weld gun," or a "gun". The anvil 12 is mounted, preferably in a repositionable manner, to the frame 14 so that a single workpiece W, as depicted in FIG.1, or a plurality of workpieces, represented herein by first and second workpieces W1, W2, as depicted in FIGS. 2 and 4, may abut against and be securely supported by the anvil 12 during welding. The FSSW system 10 also includes a FSSW weld tool 16 and a tool sleeve 18, wherein the weld tool 16 and tool sleeve 18 are preferably arranged to be coaxially opposed with the anvil 12 along axis Z, as depicted in FIG. 1. Although illustrated throughout the several Figures as having generally cylindrical or columnar shapes, it is contemplated that the anvil 12 and tool sleeve 18 could be of any functional geometric shape.

Still referring to FIG. 1, the FSSW system 10 also includes a controller, depicted in FIG. 1 in an exemplary embodiment as a micro-processor based electronic control unit (ECU) 11, having a suitable amount of programmable memory 13. The controller 11 further includes a control method or algorithm 100 of friction stir spot welding, as will be discussed in detail below.

The FSSW system 10 also includes a plurality of sensing mechanisms, represented herein by sensors/transducers S1-S6, connected to the controller 111 and configured to continuously monitor, track, and/or detect various system parameters, as will be discussed in detail below. Correspondingly, the sensors S1-S6 are also configured to transmit signals to the controller 11 representative or indicative of the aforementioned parameters being monitored, tracked, or detected. Those skilled in the art will recognize and understand that the means of communication between the sensors S1-S6 and controller 11 is not restricted to the use of electric cables ("by wire"), but may be, for example, by radio frequency and other wireless technology, or by electromechanical communication (not shown.)

Still referring to FIG. 1, the FSSW system 10 also includes a driving or plunging mechanism and a tool rotating mechanism, such as servomechanisms 15 and 17, respectively, that are connected to the controller 11 via one or more of the sensors S1-S6, or directly (depicted in phantom in FIG. 1). The plunging and rotating mechanisms 15, 17 can be, by way of example, electric, pneumatic, hydraulic, and/or magnetic devices. The controller 11 is configured or programmed, in part, to control the operation of the plunging and rotating mechanisms 15, 17 preferably based upon the signals of sensors S1-S6. For example, sensors S1 and S2 are preferably respectively configured to detect the position and plunge speed, and apply pressure, also referred to herein as the plunge force, of the weld tool 16, functioning, for example, as contact state detection means. In a similar regard, sensors S3 and S4 are preferably respectively configured to detect the rotational speed and apply torque of the weld tool 16. Finally, sensors S5 and S6 are preferably respectively configured to detect the weld gun deflection (depicted generally in phantom in FIG. 1 as D) and weld gun growth (depicted generally in phantom as G in FIG. 4)

Figure 3:
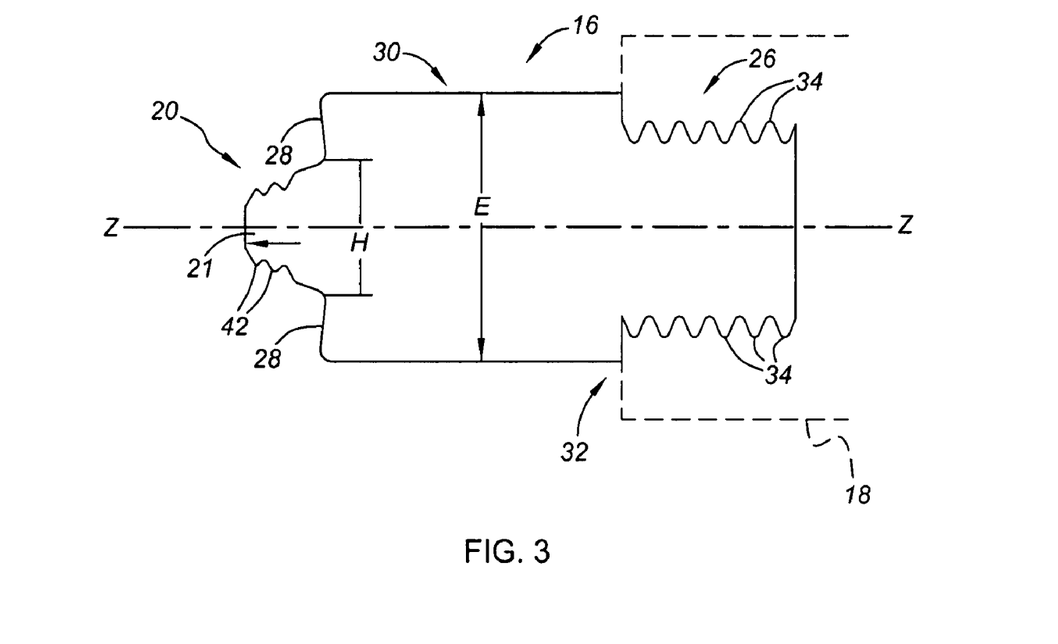
FIG. 3 is a cross-sectional view of a FSSW welding tool and tool sleeve taken along line 1-1 of FIG. 1.

As best seen in FIG. 3, the weld tool 16 is preferably a non-consumable, wear resistant (e.g., hardened steels, ceramics, etc.) monolithic or unitary cylindrical piece having a first end 26, a body portion 30, and a second end 20 having a threaded or otherwise profiled pin or probe 21 projecting substantially perpendicular from a shouldered portion 28. The first end 26 is intended to be inserted into a receiving face 32 of the tool sleeve 18, and be removably secured, attached, or locked to the tool sleeve 18 via interconnecting threads 34. The probe 21, shouldered portion 28, body 30, and first end 26 of the weld tool 16 are preferably coaxially disposed with the tool sleeve 18 to be translated along and rotated about axis Z by the plunging and rotating mechanisms 15, 17, respectively.

The friction stir spot welding of the present invention is performed using the cylindrical welding tool 16. As best depicted in FIGS. 2 and 4, a pair of workpieces W1 and W2 are superposed, abutted, or overlapped to form a joining or operating region, identified generally as 40 in FIG. 4. The sum total of the first workpiece thickness A and second workpiece thickness B is referred to hereinafter as the "total stack-up" thickness. The total stack-up thickness may also be defined as the thickness of the single workpiece W, as shown in FIG. 1, or the sum total thickness of a multitude of workpieces (not shown), within the intended scope of the present invention.

As illustrated in FIG. 2, the weld tool 16 is pressed or plunged one or more times, as depicted by arrows A1 and A2, into the joining region 40 through the top planes 36, 38 of workpieces W1, W2, respectively, and contemporaneously rotated, as depicted by arrow R. The highly pressurized plunging and rotation of the welding tool 16 generates large amounts of frictional heat between the probe 21, the shoulder 28, and the workpieces W1, W2. This operation/process produces a local region of highly plasticized material (identified generally by element 41 in FIG. 4) around the probe 21. As workpieces W1 and W2 plasticize, the probe 21 is able to navigate along axis Z to reach a plunge distance P, defined initially as the total stack-up thickness (A+B) less a bottom thickness or dimension C. P=(A+B)−C. The rotation R of the weld tool 16 and ensuing frictional heat effectively "stirs" the plasticized material 41 in the operating region 40. Notably, the direction of rotation R can be clockwise (as illustrated in FIG. 2) or counterclockwise (not shown), without departing from the scope of the present invention.

Thereafter, the second end 20 (including the probe 21 and shoulder portion 28) is withdrawn from the operating region 40, illustrated by arrow A2 of FIG. 2, allowing the plasticized material 41 to cool and harden, thereby reversing the plasticized condition. Once the operating region 40 is hardened, a FSSW weld 24 is formed, joining the first workpiece W1 to the second workpiece W2. The contours of the resulting FSSW weld 24 are generally defined by the geometry of the weld tool 16, namely the diameter E of the body portion 30, and the diameter H of the probe 21, as best seen in FIG. 4.

Referring again to FIG. 3, the probe 21 preferably includes a plurality of threads or steps 42 disposed along a frusta-conical contour. The threads 42 are intended to promote coalescence by "stirring" or "mixing" the plasticized material 41 contributed by each of the first and second workpieces W1, W2 to the operating region 40. Even though FIG. 3 illustrates the probe 21 with a frusta-conical geometry, it is considered to be within the scope of the present invention that the probe 21 take on other functional shapes (i.e., cylindrical or generally contoured.) Additionally, the threads 42 may be completely omitted from the structure provided in FIG. 3, or may take on additional configurations, such as, by way of example, stepped spirals (not shown.)

Figure 6:
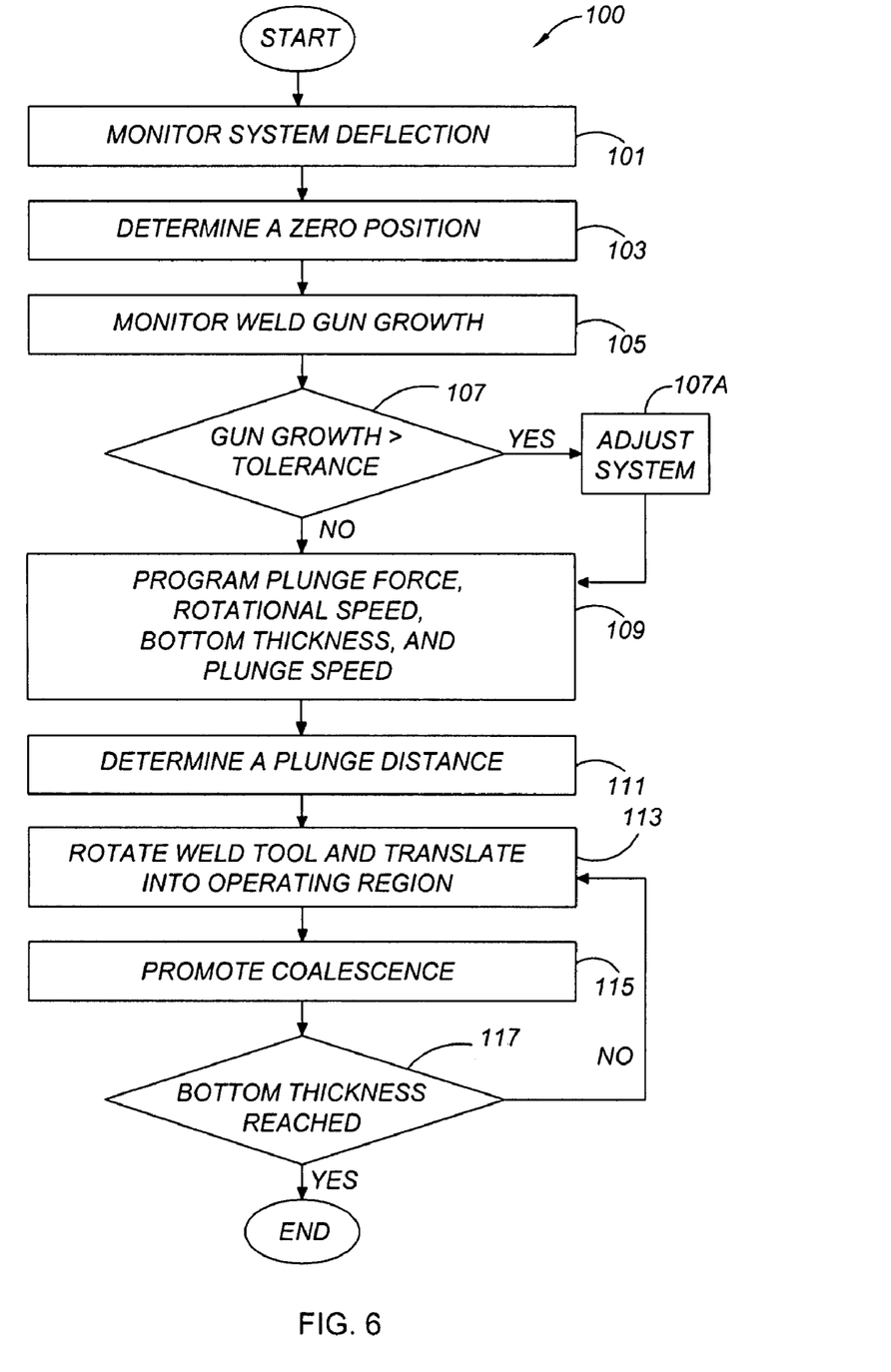
FIG. 6 is a flow chart illustrating the algorithm or method of friction stir spot welding in accordance with the present invention.

With reference now to the flow chart in FIG. 6, a solid-state welding technique, namely the method of friction stir spot welding ("FSSW") is shown generally as 100 in accordance with the present invention. The method or algorithm 100 is described herein with respect to the structure illustrated in FIGS. 1 through 4. However, the present invention may also be applied to other types of solid-state welding techniques. In addition, the method 100 can be applied to all FSSW welding machines, including, but not limited to, robot-carried C-guns, pedestal-type machines and gantry-type machines.

The method 100 begins with first continuously monitoring or determining a system deflection D for a predetermined plunge force F, as step 101. The force necessary to obtain a FSSW joint 24 is relatively large, for instance as high as 18 kN for welding aluminum. Consequently, the C-Frame 14 will deflect under these forces due to the bending of the various components used to fabricate the C-Frame 14. FIGS. 1 and 4 illustrates the FSSW system 10 under load, the deflection D of the C-Frame 14 depicted generally in phantom, while the solid lines of FIG. 1 illustrate the FSSW system 10 absent any load (identified generally by element 22.) In order to ensure accurate plunge distance control, it is necessary to determine the amount of deflection D present in the FSSW system 10, as will be further clarified below.

A zero position θ is also determined and/or calibrated, as step 103. The zero position θ is preferably defined relative to the top surface 44 of the anvil 12. However, the zero position θ may also be defined with respect to the bottom surface 39 of the bottom workpiece W2.

During continuous welding, some parts of the FSSW system 10 heat up to elevated temperatures, and may result in the weld gun 14 thermally expanding or "growing" (on the order of a few tenths of one millimeter). This thermal expansion, referred to hereinafter as weld gun growth G, results in the zero-position θ unintentionally changing. Accordingly, the FSSW system 10 should properly account for the gun growth G in order to provide an accurate and the plunge distance P.

A first means of achieving accurate plunge distance control in accordance with the present invention is to monitor and compensate for this growth by properly offsetting the FSSW system 10. As such, step 105 requires systematically monitoring weld gun growth G to determine if the weld gun growth G exceeds a predetermined tolerance or threshold, outside of which the mechanical properties of FSSW weld 24 will be compromised. Correspondingly, step 107 includes determining if the weld gun growth G exceeds the predetermined tolerance and, as step 107A, compensating or adjusting the FSSW system 10 in response to the weld gun growth G exceeding the predetermined tolerance. However, if the weld gun growth G does not exceed the predetermined tolerance, step 107A is bypassed during the iteration of method 100.

One means of compensating for the weld gun growth G is to place temperature sensors or transducers, e.g., sensor S6 of FIG. 1, at critical locations in the FSSW system 10, such as the hot parts of the spindle (not shown). To maintain accurate plunge distance control in this instance, a temperature compensation program (not shown) is employed or implemented to calculate a temperature offset necessary to counteract or neutralize the effect of the weld gun growth G. Alternatively, or in addition to the temperature offset operation noted above, a threshold weld number or weld count can be determined wherein the weld gun growth G will expectedly exceed the predetermined tolerance. Responsively, as second means of compensating for weld gun growth G, the FSSW system 10 (preferably the zero position θ) is recalibrated if the threshold weld number has been reached. It should be noted that steps 105 and 107 may be performed at any point within, or actively throughout the method 100 to compensate for the weld gun growth G.

Figure 5:
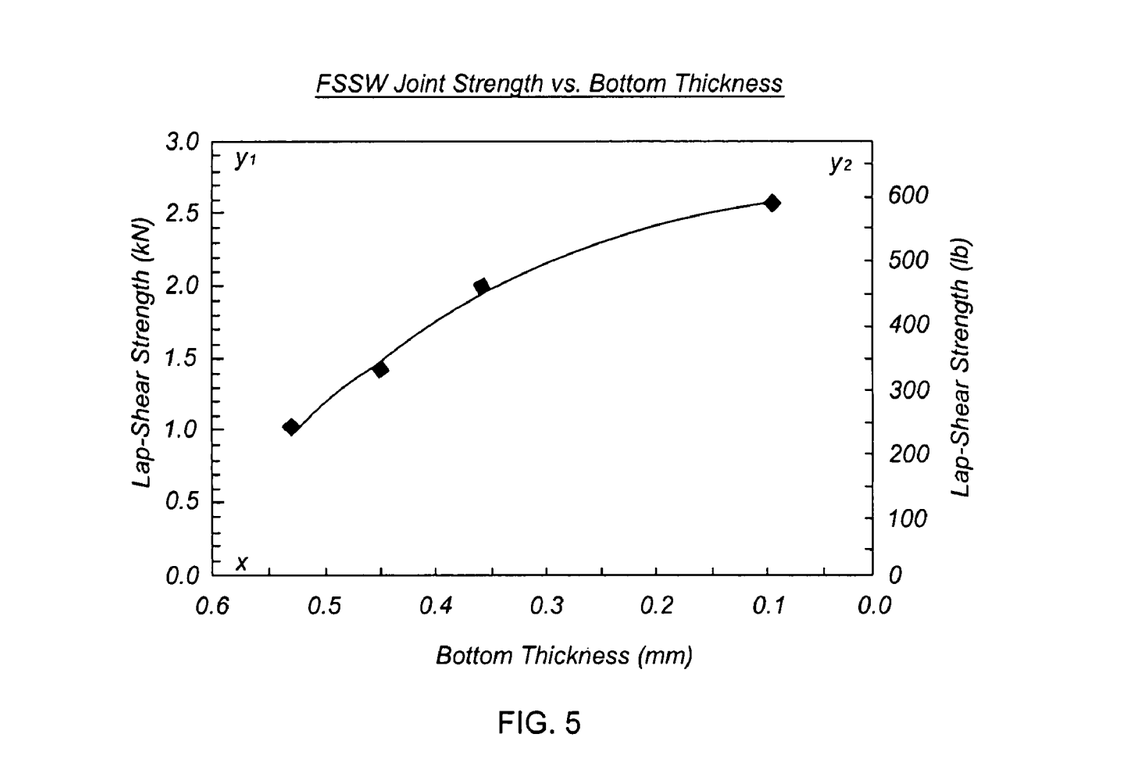
FIG. 5 is a graph illustrating an exemplary relationship between the lap-shear strength of a FSSW weld and its bottom thickness in accordance with the present invention.

Bottom thickness is critical to the strength of the FSSW weld 24. The graph in FIG. 5 provides an exemplary relationship between the bottom thickness C, in millimeters (mm), and lap-shear strength of a FSSW weld 24, in kilo-Newtons (kN, on the primary Y-axis) and pounds (lb, on the secondary Y-axis). Even minor unintended variations in plunge distance (on the scale of a tenth of a millimeter) and hence in bottom thickness can result in the final work product failing to comply with pre-established product tolerances. For example, FIG. 5 illustrates that a variation of 0.1 mm (between 0.35 and 0.45) in bottom thickness can result in approximately a 600N (or 135 lb) reduction in lap-shear strength. Accordingly, the method 100 requires that the plunge distance P be controlled closely and consistently throughout the welding process to achieve the mechanical properties necessary to meet pre-established weld tolerances uniformly among the series of resultant FSSW welds 24, e.g., FIG. 4.

In actual welding, it is the bottom thickness C that is used to program the FSSW system 10 to reach the plunge distance P. The bottom thickness C also provides a convenient way for quality control and inspection. As noted above, and illustrated in FIG. 4, the bottom thickness C is defined as the difference between the total stack-up thickness (A+B) and the plunge distance P: $C=(A+B)-P$. However, this equation is valid only when there is no deflection D in the FSSW system 10; namely, there is no deflection D of the weld gun 14.

As a second means of achieving the desired bottom thickness, the present invention provides for achieving the actual bottom thickness C in the workpieces W1, W2 via consistent and accurate manipulation of the plunge distance P to compensate the FSSW system 10 for the deflection D. Step 101 includes calculating a system deflection D for a predetermined plunge force F. Notably, step 101 may be completed during calibration (prior to a welding operation) or in real-time throughout the welding process 100 (as illustrated in FIG. 1.)

When taking the plunge force F into account as a welding parameter, it is possible for the control system, e.g., controller 11, to calculate the deflection value D for any given force at any given time, e.g., via sensor S5. During calibration, the weld gun 14 is first set at the zero position θ (preferably anvil surface 44) at a minimum load—generally, a small load, which causes a very small deflection, is applied to maintain positive contact between the weld tool and the anvil. The position of the gun 14 is thereafter recorded, i.e., by signals from sensors S1 and S2, when the weld gun 14 is subjected to a peak program force, e.g., force F of FIG. 1. Between the minimum and maximum program forces additional force levels may be used to do the deflection calibration. Given that there is no welding occurring during calibration, the displacement measured must be solely accounted for as deflection D of the weld gun 14. Within the elastic range of the weld gun 14, the gun deflection D should be substantially linear from minimum force to peak force. Therefore, it is possible to determine the amount of deflection D that will occur in the C-Frame 14 at any plunge force within the range of zero to maximum program force by mathematical interpolation. The deflection D is thereafter applied to the above equation for plunge distance P to achieve accurate plunge distance control in the FSSW system 10. Accordingly, in step 109, bottom thickness, spindle speed, plunge force and plunge speed are programmed. Additionally, method 100 includes calculating the plunge distance P based upon at least the stack-up thickness (A+B), bottom thickness C, and system deflection D, as step 111. $P=(A+B)-C+D$. Alternatively, deflection D can be determined by using a pre-calibrated force-deflection curve where the force input is derived from a pre-calibrated motor current-force relationship.

Still referring to FIG. 6, step 113 includes causing the weld tool 16 to enter the operating or joining region 40 at the plunge force F and plunge speed, while contemporaneously causing relative rotational or cyclic movement R between the second end 20 of the weld tool 16, including the probe 21 and shoulder portion 28, and the workpiece W, FIG. 1, or workpieces W1, W2, FIG. 2, whereby frictional heat and pressure is generated (as described above), thereby causing the operating/joining region 40 to take up a plasticized condition.

The method 100 also includes, as step 115, promoting coalescence after the operating region 40 has taken up a plasticized condition 41, and before completion of the welding operation. Step 115 may be accomplished solely via the threads 42 on the probe 21, as described above. However, it is preferable that coalescence also be promoted by programming the FSSW system 10 to complete a dwell operation, whereby the weld tool 16 rotates and dwells at a predetermined dwell depth, illustrated generally as Q in FIG. 4, in the operating/joining region 40, for a predetermined dwell time or interval. The dwell depth Q and dwell time can be varied to further manipulate weld heat input to the plasticized region/ material 41 in order to achieve desired mechanical properties of the FSSW welds 24. Notably, the dwell operation may be performed more than once in any given operating region 40, may be performed at varying depths, and/or with varying rotational speeds R to achieve varying results. The rotational and plunge speeds between any two dwell positions may be different. It is also within the scope and spirit of the present invention to omit step 115.

The method of friction stir spot welding 100 is controlled by the actual plunge distance P, the actual plunge distance P being controlled from the bottom surface 39 of the lowest work piece, W or W2, or the top surface 44 of the anvil 12, by the bottom thickness C (as described above with respect to FIGS. 1 and 4.) As such, step 117 requires that the weld tool 16 be programmed to exit the operating/joining region 40 after the bottom thickness C has been reached, and allowing the plasticized condition 41 of the operating or joining region 40 to cool down and harden, thereby completing a single weld or operation on the workpiece W, or workpieces W1, W2. In other words, once the weld control achieves the actual bottom thickness C, the welding operation is stopped.

The method 100 preferably includes at least steps 101-117. However, it is within the scope and spirit of the present invention to omit steps, include additional steps, and/or modify the order presented in FIG. 6. It should be further noted that the method 100 represents a single FSSW weld operation. However, it is contemplated that the method 100 be applied in a systematic manner to produce multiple FSSW welds 24, as illustrated in FIG. 2. Furthermore, the method 100 can be used in a variety of manufacturing processes, by way of example, for operating on a single workpiece W (FIG. 1), for joining two or more workpieces together (W1 and W2 of FIGS. 2 and 4), or for joining two ends of a single workpiece together (i.e. to form tube or column.)

The method 100 provides for consistency in resultant mechanical properties of the FSSW welds 24, and prevents circumstances that may interfere with the strength or integrity of welds 24, such as a gap(s) between overlapped workpieces W1, W2, or uncontrolled FSSW system 10 temperature changes during continuous welding. In addition, the above method 100 prevents the weld tool 16 from producing a hole through the bottom work piece W2 and/or plunging into and damaging the anvil 12, even when the workpiece W, or workpieces W1, W2 are absent. Furthermore, this invention allows a user of the FSSW system 10 to manipulate weld heat input by causing the rotating FSSW tool to dwell at desired depths within the work piece W or workpieces W1, W2 for a predetermined time interval to achieve desired mechanical properties of the FSSW joint. This dwell operation may also improve the appearance of weld flash.

While the best modes for carrying out the present invention have been described in detail herein, those familiar with the art to which this invention pertains will recognize various alternative designs and embodiments for practicing the invention within the scope of the appended claims.

The invention claimed is:

1. A method for assuring a predetermined bottom thickness at an actual position in an operating region of at least one workpiece by a friction stir spot welding system having a weld gun, comprising:
   monitoring system deflection occurring substantially along a rotational axis of the weld gun;
   determining a zero position;
   calculating a plunge distance relative to said determined zero position based upon at least a predetermined stack-up thickness, the bottom thickness, and said monitored system deflection;
   causing a weld tool to enter the operating region at a predetermined plunge force and a predetermined plunge speed and causing relative rotational movement about said rotational axis between said weld tool and the at least one workpiece, while plunging up to said plunge distance, whereby pressure and frictional heat is generated, thereby causing the material in the operating region to plasticize; and
   causing said weld tool to exit the operating region after said bottom thickness has been reached, wherein the operating region is allowed to cool and the plasticized material to harden, thereby completing a single weld on the workpiece.

2. The method of claim 1, further comprising:
   monitoring weld gun growth;
   determining if said weld gun growth exceeds a predetermined tolerance; and
   calculating a temperature offset necessary to compensate for said weld gun growth; and
   recalculating said plunge distance based upon said temperature offset in response to said weld gun growth exceeding said predetermined tolerance.

3. The method of claim 1, further comprising:
   determining a threshold number of welds at which weld gun growth will exceed a predetermined tolerance;
   determining if the friction stir spot welding system has completed said threshold number of welds; and
   resetting said zero position to compensate for said weld gun growth in response to said threshold number of welds having been completed.

4. The method of claim 1, further comprising:
   causing said weld tool to dwell in a dwell region within the at least one workpiece for a predetermined dwell time, wherein said causing said weld tool to dwell includes maintaining said weld tool at a substantially constant depth for said predetermined dwell time and said predetermined dwell time is non-transient;
   after said causing said weld tool to dwell, causing said weld tool to exit the operating region to achieve desired mechanical properties of the weld.

5. The method of claim 4, wherein said dwell region is a single depth within the operating region:

6. The method of claim 4, wherein said weld tool is rotated at varying speeds during said dwell time.

7. The method of claim 4, further comprising:
   causing said weld tool to dwell at more than one depth within said dwell region.

8. The method of claim 4, wherein said causing said weld tool to dwell in said dwell region includes causing said weld tool to plunge at a second predetermined plunge speed between a first and a second dwell position within said dwell region.

9. The method of claim 4, wherein said causing said weld tool to dwell in said dwell region includes causing said weld tool to plunge at a second predetermined plunge force between a first and a second dwell position within said dwell region.

10. The method of claims 1, further comprising:
    promoting coalescence after the operating region has taken up a plasticized condition and before said causing said weld tool to exit from the operating region.

11. The method of claim 1, wherein said monitoring system deflection includes using a pre-calibrated force-deflection curve to determine an amount of deflection with a force input from a pre-calibrated motor current-force relationship.

12. A method of achieving a predetermined bottom thickness in joining a plurality of workpieces defining a joining region therebetween by a friction stir spot welding system having a weld tool coaxially opposed to an anvil operatively connected to a weld gun, comprising:

determining a system deflection for a predetermined plunge force, wherein said system deflection occurs substantially along rotational axis of the weld tool;

determining and calibrating a zero position;

monitoring weld gun growth to determine if said weld gun growth exceeds a predetermined tolerance;

compensating the friction stir spot welding system in response to said weld gun growth exceeding said predetermined tolerance;

calculating a plunge distance relative to said zero position based upon at least a stack-up thickness, the bottom thickness, and said system deflection;

causing the weld tool to enter the joining region to reach said plunge distance at said plunge force and a predetermined plunge speed;

causing relative rotational movement about said rotational axis between the weld tool and the workpieces, whereby pressure and frictional heat is generated, thereby causing the joining region to achieve a plasticized condition;

promoting coalescence in the joining region; and causing the weld tool to exit the joining region after said bottom thickness has been reached, wherein the joining region is allowed to cool and the plasticized condition to reverse, thereby completing a single weld on the workpiece.

13. The method of claim 12, wherein said promoting of coalescence step includes causing the weld tool to dwell within a dwell region within the joining region of the plurality of workpieces for a predetermined dwell time before causing the weld tool to exit the joining region, wherein said causing the weld tool to dwell includes maintaining the weld tool at a substantially constant depth for said predetermined dwell time and said predetermined dwell time is non-transient.

14. The method of claim 13, wherein said weld tool is rotated at varying speeds during said dwell time.

15. The method of claim 13, wherein said dwell region is a single depth within the operating region.

16. The method of claim 13, further comprising:
    causing said weld tool to dwell at more than one depth within said dwell region.

17. The method of claim 13, wherein said causing said weld tool to dwell in said dwell region includes causing said weld tool to plunge at a second predetermined plunge speed between a first and a second dwell position within said dwell region.

18. The method of claim 13, wherein said causing said weld tool to dwell in said dwell region includes causing said weld tool to plunge at a second predetermined plunge force between a first and a second dwell position within said dwell region.

19. The method of claim 13, wherein said causing said weld tool to dwell in said dwell region includes causing said weld tool to rotate at a second predetermined rotational speed at a second dwell position within said dwell region.

20. The method of claim 12, wherein said determining a system deflection includes zeroing during calibration a first anvil position when said anvil is at a minimum force and recording a second anvil position when said anvil is at peak force, whereby to account for deflection in said anvil.

21. The method of claim 12, wherein said compensating step comprises calculating a temperature offset necessary to compensate for said weld gun growth; and wherein said calculating a plunge distance is further based upon the temperature offset in response to said weld gun growth exceeding said predetermined tolerance.

22. The method of claim 21, wherein said compensating step further comprises determining a threshold number of welds at which said weld gun growth will exceed said predetermined tolerance; and resetting said zero position in response to said threshold number of welds being reached.

23. The method of claim 12, wherein said determining said system deflection includes using a pre-calibrated force-deflection curve to determine an amount of deflection with a force input from a pre-calibrated motor current-force relationship.

24. The method of claim 1, further comprising:
measuring the bottom thickness; and
determining whether said measured bottom thickness is within a predetermined range.

25. The method of claim 12, further comprising:
measuring the bottom thickness; and
determining whether said measured bottom thickness is within a predetermined range.

\* \* \* \* \*